United States Patent [19]

Lockwood

[11] Patent Number: 4,492,247
[45] Date of Patent: Jan. 8, 1985

[54] SEQUENCING VALVE

[75] Inventor: George H. Lockwood, Wilton Manors, Fla.

[73] Assignee: Anthony Manufacturing Corp., Azusa, Calif.

[21] Appl. No.: 469,204

[22] Filed: Feb. 24, 1983

[51] Int. Cl.³ ..................... F16K 11/00; F16K 31/12
[52] U.S. Cl. ................................ 137/119; 137/624.14
[58] Field of Search .............. 137/119, 624.14, 625.11, 137/625.15; 239/66, 124

[56] References Cited

U.S. PATENT DOCUMENTS

| | | |
|---|---|---|
| Re. 29,252 | 6/1977 | Miller . |
| 2,666,450 | 1/1954 | Berry . |
| 2,793,908 | 5/1957 | Carver, Jr. .................. 137/624.14 |
| 3,181,550 | 5/1965 | Okabe . |
| 3,369,204 | 2/1968 | Davis . |
| 3,369,565 | 2/1968 | Haggard, Jr. . |
| 3,427,265 | 10/1969 | Davis . |
| 3,431,933 | 3/1969 | Tidd . |
| 3,524,470 | 8/1970 | Kah, Jr. et al. . |
| 3,533,432 | 10/1970 | Kirby . |
| 3,635,237 | 1/1972 | Kah, Jr. . |
| 3,785,391 | 1/1974 | Miller . |
| 3,924,652 | 12/1975 | Kah, Jr. . |
| 4,034,775 | 7/1977 | Slagel . |
| 4,092,995 | 6/1978 | Stubenruss . |
| 4,109,670 | 8/1978 | Slagel . |
| 4,125,124 | 11/1978 | Kah . |

Primary Examiner—Martin P. Schwadron
Assistant Examiner—James R. Shay
Attorney, Agent, or Firm—Fulwider, Patton, Rieber, Lee & Utecht

[57] ABSTRACT

An improved sequencing valve of the type having a valve disk mounted within a valve housing for reciprocating and indexing movement between an inlet port and a plurality of outlet ports to couple a water supply line in sequence with a plurality of outlet conduits in response to turning on and off of a water supply. The valve disk has a flow opening therein which is closed by a spring-biased control valve when the water supply is turned on such that the valve disk is responsive to a relatively low and selected fluid pressure for movement to a position seated over the outlet ports with the flow opening in alignment with one of the outlet ports whereupon the control valve opens with increasing fluid pressure to permit water flow to the aligned outlet port. When the water supply is turned off, the control valve closes the flow opening, and water within the housing at the upstream side of the valve disk is discharged through a bleed port to a different outlet port thereby relieving back pressure on the valve disk and insuring spring-assisted movement away from the outlet ports. In a preferred form, an externally exposed selector dial moves with the valve disk to provide an externally visible indication of valve disk position with respect to the outlet ports, wherein this selector dial can be rotated when the water supply is off, to select the next outlet port to be coupled with the supply line.

35 Claims, 7 Drawing Figures

SEQUENCING VALVE

BACKGROUND OF THE INVENTION

This invention relates generally to sequencing valves for coupling a plurality of outlet conduits in sequence with a single supply line through which a fluid under pressure, such as water, is provided. More specifically, this invention relates to an improved sequencing valve particularly for use in an irrigation sprinkler system wherein the sequencing valve operates in response to a selected relatively low water pressure in a water supply line and wherein the valve operation is substantially unaffected by the relative elevational position of the sequencing valve in the system.

Sequencing valves in general are known particularly for use in an irrigation environment for coupling a single water supply line sequentially with a plurality of outlet conduits each including a series of irrigation sprinklers installed along its length. Such sequencing valves typically comprise a valve housing having one inlet port for connection to the water supply line and a plurality of outlet ports respectively coupled to the plurality of outlet conduits, wherein the inlet port and the outlet ports open into a common chamber within the housing. A valve disk is carried within the chamber generally between the inlet port and the plurality of outlet ports, and this valve disk has a flow opening therein for permitting water flow from the inlet port to one of the outlet ports. The valve disk is mounted for reciprocating and indexing motion toward a seated position over the outlet ports in response to the pressure and flow rate of water in the supply line when the water supply is turned on and away from the outlet ports in response to a spring force when the water supply is turned off. Accordingly, each time the water supply is turned on and off, the valve disk reciprocates and indexes with respect to the outlet ports to align the flow opening in sequence with the plurality of outlet ports such that irrigation water is supplied in sequence to the outlet conduits. This turning on and off of the water supply is accomplished by operation of an on-off valve positioned between the sequencing valve and the water supply, wherein the on-off valve can be operated manually or in response to a clock-controlled solenoid or the like. For examples of sequencing valves of this general type, see U.S. Pat. Nos. 3,460,560; 3,642,022; 4,034,775; 4,125,124; and Re. 29,252.

Sequencing valves of the general type described advantageously permit supply of water to several irrigation zones, which can be remotely located, in response to operation of a single on-off valve which can be located at any convenient, readily accessible position. For example, in an irrigation sprinkler system for a golf course or the like, the sequencing valve and its associated outlet conduits can be installed at a selected location on the course wherein the outlet conduits distribute water respectively to the irrigation zones. The sequencing valve is supplied with water via a single water supply line which is interrupted at a convenient position by the on-off valve. The on-off valve is appropriately turned on and off to vary the water pressure in the supply line thereby causing the sequencing valve to couple the water supply in sequence to the several outlet conduits.

A variety of problems and disadvantages, however, have been encountered with sequencing valves of this general type. For example, when the water supply is turned on, the flow opening in the valve disk permits a substantial flow rate of water to pass therethrough without forcing the disk toward the desired position seated over the outlet ports, whereby a relatively high flow rate is required to obtain the desired valve disk movement. In addition, when the water supply is turned off, the valve disk can be subjected to a significant fluid back pressure as a result of water remaining within the supply line and/or an outlet conduit when the sequencing valve is located in the irrigation system at an elevation which is low relative to one or more irrigation circuits to which outlet conduits are connected. Since this back pressure can lock the valve disk in a seated position over the outlet ports to prevent the desired reciprocating and indexing valve disk movement, use of the sequencing valve has been limited to irrigation systems wherein the sequencing valve can be installed at a relatively high terrain elevation. Still further, prior art sequencing valves have not provided any externally visible means for determining which outlet port will be next connected with the water supply line, nor have these sequencing valves provided any externally accessible adjustment means for permitting selection of the outlet port to be connected next with the water supply line.

In an effort to improve the response characteristics of the valve disk to relatively low water flow rate, it has been proposed to provide a pressure-responsive valve for temporarily closing the valve disk flow opening when the water supply is turned on thereby to prevent water flow through the flow opening until the valve disk reaches a seated position over the outlet ports. See, for example, U.S. Pat. No. 3,524,470 which provides pressure-responsive resilient flaps formed integrally with a resilient valve disk. However, while such devices improve low flow rate valve disk response, they have not been adapted to meet a variety of different operating conditions responsive to different water flow rates and/or pressures without requiring major modifications or substitution of parts. Moreover, these sequencing valves have not addressed the problem of fluid back pressure when the sequencing valve is installed in an irrigation system at a relatively low terrain elevation. Still further, no externally accessible or visible structures have been provided for indicating or for permitting selection of the next outlet conduit to be connected to the water supply line.

The present invention overcomes the problems and disadvantages of the prior art by providing an improved sequencing valve having a valve disk adapted for movement toward and away from a plurality of outlet ports in response to selected operating conditions, wherein valve disk movement is substantially unaffected by relative terrain elevation. Moreover, the position of the valve disk relative to the outlet ports is visually indicated and adjustable from the exterior of the sequencing valve.

SUMMARY OF THE INVENTION

In accordance with the invention, an improved sequencing valve is provided, particularly for use in an irrigation system, to couple a single water supply line in sequence with a plurality of outlet conduits each including one or more irrigation outlets installed along its length. The sequencing valve includes a valve housing having an inlet port for connection to the water supply line and a plurality of outlet ports for connection respectively to the outlet conduits, with a valve disk carried between the inlet and outlet ports for coupling the inlet port in sequence with the outlet ports. According to the invention, the valve disk is adapted for a selected response, particularly to low flow rate operating conditions substantially independent of the elevation of the sequencing valve relative to other portions of the irrigation system. In addition, the sequencing valve includes externally accessible means for indicating the position of the valve disk relative to the outlet ports and for permitting adjustment thereof.

In one preferred form of the invention, the inlet and outlet ports open respectively into opposite sides of a common valve chamber within which the valve disk is located. The valve disk is mounted for reciprocating and indexing pressure-responsive movement toward a seated position over the outlet ports when the water supply is turned on and for spring-assisted movement away from the outlet ports when the water supply is turned off. This movement is accompanied by sequential alignment of a flow opening in the valve disk with each outlet port in sequence to couple the outlet ports one at a time with the inlet port. A control valve biased by a selected spring maintains the flow opening closed when the water supply is turned on until the valve disk reaches a seated position over the outlet ports with the flow opening aligned with an outlet port, whereupon the control valve opens to permit water flow into the aligned outlet port.

When the water supply is turned off, water flow through the flow opening terminates thereby eliminating the pressure differential across the control valve and permitting the control valve to close. Water remaining within the housing at the upstream side of the valve disk, which may subject the valve disk to a back pressure when the sequencing valve is installed at a relatively low terrain elevation, is discharged through a relatively small bleed port in the valve disk to another one of the outlet ports thereby relieving the back pressure and insuring spring-assisted movement of the valve plate away from the outlet ports.

In a preferred form, the bleed port is normally closed by a spring-biased valve member when the control valve is in the open position and water is flowing through the valve disk flow opening to the aligned outlet port. A follower arm carries the valve member and is engageable by the control valve when the control valve returns to its closed position, such as when the water supply is turned off, to lift the valve member from the bleed port. Accordingly, the control valve cooperates with the follower arm to close the bleed port when the control valve is opened and to open the bleed port when the control valve is closed.

In accordance with further aspects of the invention, the valve disk is carried by a guide rod which in turn supports a follower pin meshed with cam surfaces of a cam assembly for guiding the valve disk through its reciprocating and indexing motion each time water supply is turned on and off. This guide rod further supports an externally visible selector dial which moves with respect to a stationary external dial to provide a visible indication of the position of the valve disk with respect to the outlet ports. When the water supply is turned off, the selector knob protrudes from the valve housing to permit manual grasping and rotation thereof. In this condition the follower pin is within a circumferential groove in the cam assembly, permitting rotation of the valve disk to any selected position with respect to the outlet ports.

Other features and advantages of the invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

As shown in the exemplary drawings, a sequencing valve referred to generally by the reference numeral 10 is provided for coupling a single water supply line 12 in sequence to a plurality of outlet conduits 14. In a typical operating environment, the sequencing valve 10 is used in an irrigation system wherein each of the outlet conduits 14 is coupled along its length to one or more irrigation sprinklers (not shown) for supplying water to a prescribed soil area for irrigating lawns, crops, and the like. In accordance with the invention, the sequencing valve 10 includes internal valve components (not shown in FIG. 1) movably responsive to a selected relatively low flow rate in the water supply line 12 to couple the supply line from one outlet conduit 14 to another each time the water supply is turned off and on, wherein operation of these valve components is substantially unaffected by the elevation of the sequencing valve relative to other components in the irrigation system. In addition, the sequencing valve 10 includes improved seal structures for reliable operation with improved sealing of valve components and ports, as well as a selector knob 16 visible from the exterior of the sequencing valve to indicate and to permit selection of the outlet conduit 14 to be connected next to the water supply line.

Figure 1:
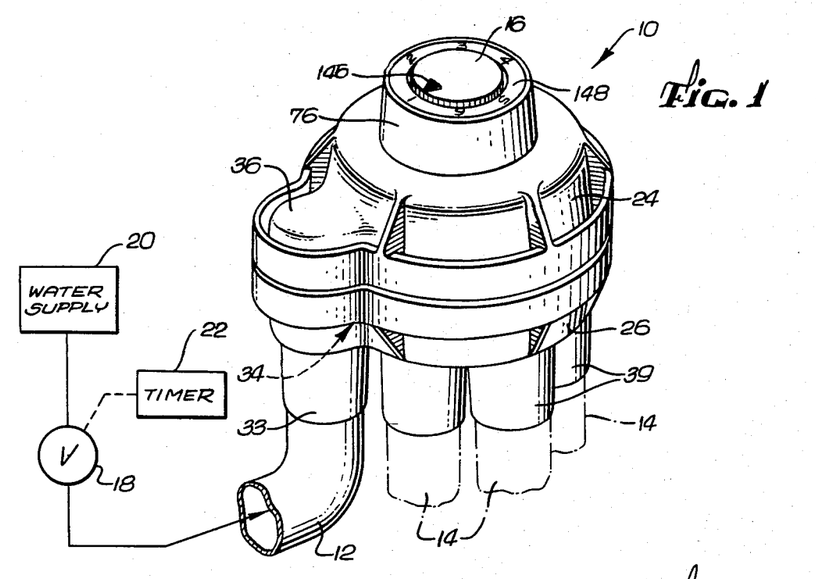
FIG. 1 is a perspective view of a sequencing valve embodying the novel features of this invention and illustrating the sequencing valve coupled between a water supply line and a plurality of outlet conduits.

The sequencing valve 10 of this invention distributes water from the single supply line 12 one at a time to each of the plurality of outlet conduits 14 in response to pressure variations in the water supplied through the supply line 12, wherein these pressure variations arise typically by turning the water supply on and off in response to operation of a single on-off valve 18. Accordingly, irrigation water can be supplied from a water supply 20 to a plurality of irrigation zones served respectively by the outlet conduits 14 without requiring separate water supply lines or on-off valves for each irrigation zone. The single on-off valve 18, which may be installed at any convenient location along the supply line 20, may be operated either manually or by use of a clock-controlled timer 22 to turn on and off the water supplied to the sequencing valve 10, which may be installed at a remote location. The sequencing valve 10 in turn distributes the water sequentially to the several outlet conduits 14.

In accordance with the invention, the present sequencing valve 10 is responsive to a relatively low water supply line flow rate for sequencing from one outlet conduit to another. This sequencing operation is substantially unaffected by any back pressure when the water supply is turned off, which insures proper valve operation irrespective of the relative elevation of the sequencing valve 10 and other components in the system. Accordingly, the sequencing valve 10 of this invention can be positioned in an irrigation system at any convenient location, as opposed to a relatively level or high elevation required for valves in the prior art. In addition, the present sequencing valve advantageously provides externally visible and adjustable means for indicating and/or selecting the particular outlet conduit 14 which will be connected next with the water supply line 12.

With reference to the exemplary drawings, a preferred form of the sequencing valve 10 is shown to include a valve housing defined by an upper generally dome-shaped housing half 24 which fits over a lower generally cup-shaped housing half 26 and is secured thereto by a plurality of screws 28 or the like fastened through mating peripheral flanges 30 and 32. The lower housing half 26 includes at one side a downwardly projecting inlet tube 33 which is adapted for connection in any suitable manner to the water supply line 12 and defines an inlet port 34 for entry of water. This water is guided upwardly through a flow passage in an aligned elbow passage member 36 at one side of the upper housing half 24 for flow into an upper side of a valve chamber 38 defined between the connected housing halves 24 and 26.

The lower housing half 26 further includes a plurality of downwardly projecting outlet tubes 39 adapted for connection in any suitable manner respectively to the plurality of outlet conduits 14 and defining a corresponding plurality of outlet ports 40 through which water can be discharged from the valve chamber 38. These outlet ports 40 may be provided in any selected number, with six of such ports 40 being illustrated by way of example in the exemplary drawings. The outlet ports 40 are arranged in an equiangularly spaced circular array disposed in a common horizontal plane about a central vertical axis 42 of the valve chamber 38 for cooperation with a valve disk 44 mounted within the valve chamber.

Figure 2:
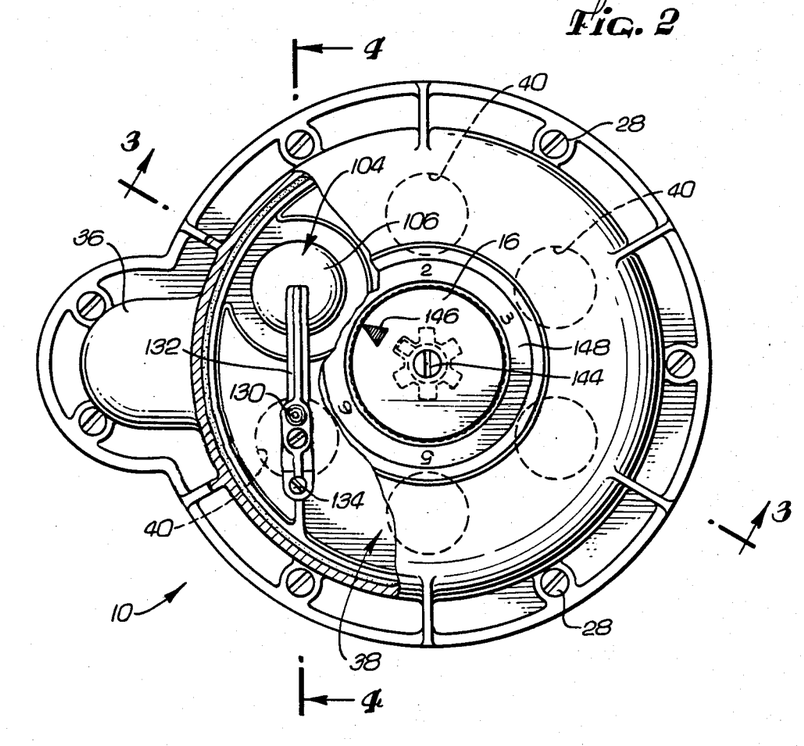
FIG. 2 is an enlarged top plan view of the sequencing valve with portions broken away to illustrate interior construction details thereof.

The valve disk 44 is mounted for pressure-responsive movement reciprocally toward and away from the circular array of outlet ports 40 and for indexing motion about the vertical axis 42 to connect the outlet ports 40 in sequence and one at a time with the inlet port 34 each time the water supply is turned on and off. This valve disk comprises, as shown best in FIGS. 2-4, a generally circular structure which can be formed from a molded plastic or the like to include a generally annular seal face 46 bounded at its outer periphery by an upstanding peripheral skirt 48 and at its inner periphery by a central hub 56, with appropriate gussets 45 extending between the hub 56 and the skirt 48 to provide structural reinforcement.

Figure 3:
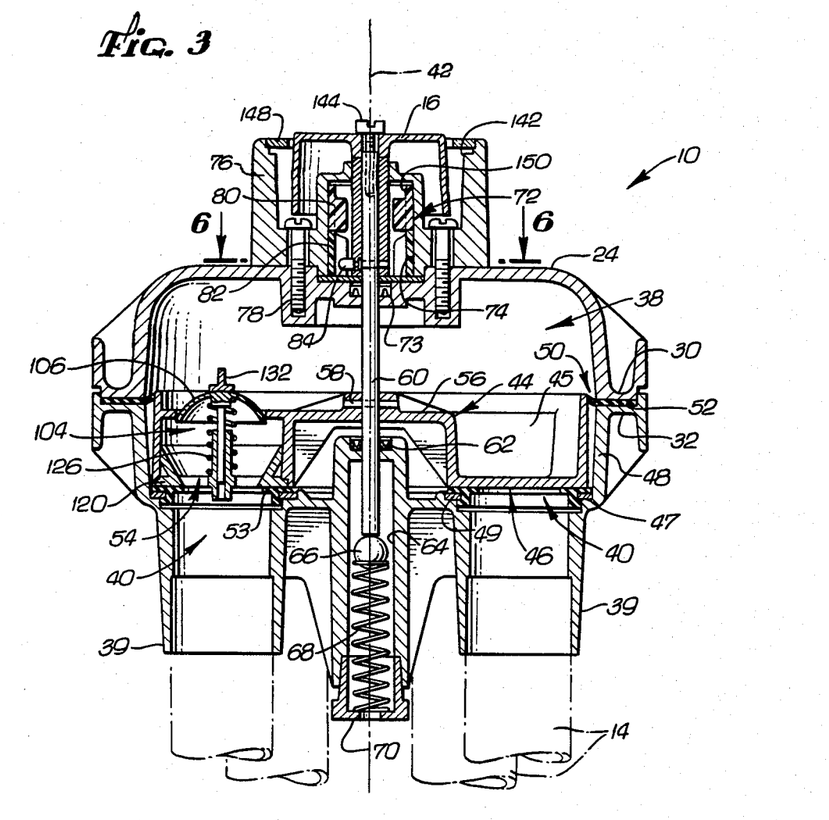
FIG. 3 is a vertical section taken generally on the line 3—3 of FIG. 2 and illustrating an internal valve disk in a position seated over a plurality of outlet ports.
Figure 5:
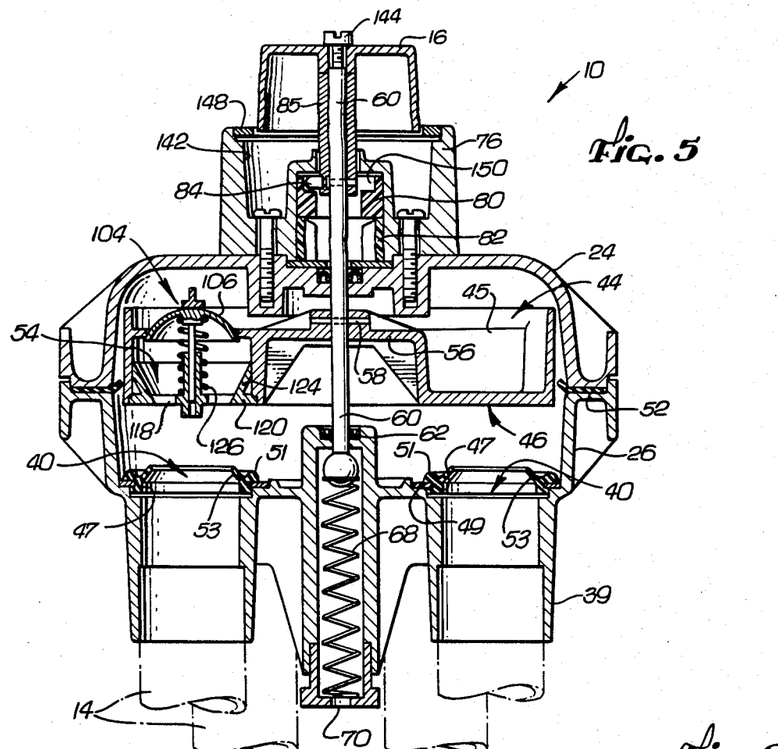
FIG. 5 is a vertical section similar to FIG. 3 and illustrating the valve disk in a position spaced from the plurality of outlet ports.

The skirt 48, as shown in FIGS. 3 and 5, is shaped for sealing association with a radially inwardly and upwardly projecting inner lip 50 of an annular resilient flapper seal 52 trapped between the mating flanges of the upper and lower housing halves 24 and 26. This flapper seal 52, as shown best in FIG. 5, has a normal configuration to project radially inwardly and axially toward the inlet side of the valve chamber in slightly spaced relation with the skirt 48 such that the seal 52 does not frictionally restrict valve disk movement while providing a relatively high resistance to fluid flow to prevent excessive bypass of water between the seal 52 and the skirt 48.

The annular seal face 46 of the valve disk is interrupted by a single flow opening 54 through which water supplied via the inlet port 34 to the upstream or upper side of the valve disk 44 can flow downwardly through the flow opening into one of the outlet ports 40. Water leakage from the selected outlet port is prevented by annular resilient port seals 47 bounding the outlet ports and held by retaining rings 49 or the like in a position for sealing engagement by the seal face 46 of the valve disk 44. More particularly, as shown in a normal uncompressed state in FIG. 5, these port seals 47 each include an upstanding annular bead 51 for engagement by the seal face 46 to prevent water leakage from the flow opening 54 into an outlet port 40 not aligned therewith. Each port seal 47 further includes a relatively thin, compliant annular inner lip 53 projecting radially inwardly and axially upwardly to a normal position slightly above the bead 51 to assure correct opening of the ports 40 during sequencing, as will be described in more detail.

The central hub 56 of the valve disk 44 is secured by a pin 58 for reciprocating and indexing movement with a guide rod 60 extending vertically through the valve chamber 38 in coincidence with the central vertical axis 42. From the central hub 56, this guide rod 60 extends downwardly through a seal ring 62 into a vertically oriented spring chamber 64 for engagement with a ball 66 supported at the upper end of a compression spring 68. The lower end of this compression spring reacts against a plug 70 at the lower end of the spring chamber 64 such that the spring 68 urges the valve disk upwardly, as viewed in FIG. 5, toward a normal position spaced above the circular array of outlet ports 40.

The upward motion of the valve disk 44 is accompanied by a specifically selected indexing movement resulting from interaction between the guide rod 60 and a cam assembly 72 mounted on top of the upper housing half 24. More specifically, the guide rod 60 projects upwardly through a seal ring 73 lining an opening in the upper housing half 24 and further through a cam chamber 74 defined by a cap 76 fastened to the upper housing half 24 as by a plurality of screws 78 or the like. A pair of cam rings 80 and 82 are retained within the cam chamber 74 in stacked relation and cooperate to define a specifically configured series of cam surfaces which control indexing motion of the guide rod 60 and thus also the valve disk 44 with respect to the outlet ports 40.

Figures 6, 7:
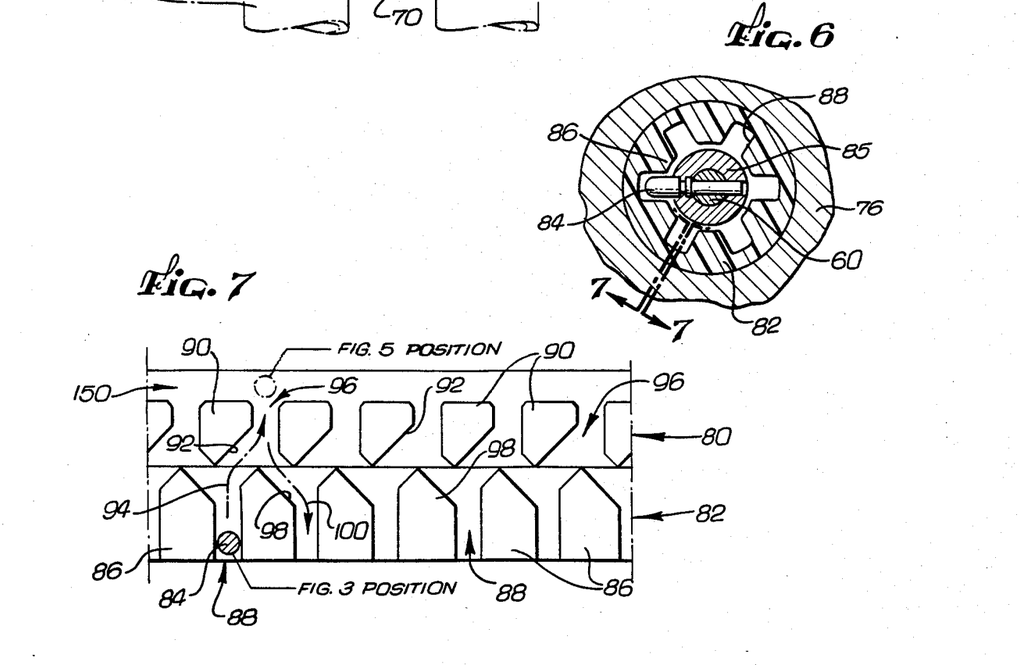
FIG. 6 is a fragmented horizontal section taken generally on the line 6—6 of FIG. 3.
FIG. 7 is a developed elevation view taken generally on the line 7—7 of FIG. 6 and illustrating construction details of a cam assembly.

The indexing motion is achieved in response to movement of a cam follower pin 84 which projects radially outwardly from a sleeve 85 carried about the guide rod 60 into meshing and following relationship with the cam surfaces on the cam rings 80 and 82. More specifically, as viewed best in FIG. 7, the lower cam ring 82 includes a circumferentially arranged plurality of upwardly projecting cam teeth 86 defining therebetween slots 88 in which the cam follower pin 84 moves upwardly as the valve disk 44 moves from its lower position, as viewed in FIG. 3, to its upper position, as viewed in FIG. 5. These cam teeth 86 are aligned rotationally in a generally staggered relation with a corresponding plurality of downwardly projecting cam teeth 90 on the upper cam ring 80, wherein these cam teeth 90 are separated by slots 96 and include angularly oriented lower surfaces 92 for guiding the pin 84 through a rotational increment, as illustrated by arrow 94, to fit between a pair of the teeth 90. Thus, as the valve disk 44 moves upwardly away from the outlet ports 40, the valve disk rotates slightly to alter the position of the flow opening 54 with respect to the outlet ports.

When the water supply is turned on to supply water through the inlet port 34 to the upstream side of the valve disk 44, the close proximity of the flapper seal 52 relative to the valve disk skirt 48 prevents excessive bypass of water around the valve disk such that the water flow urges the valve disk downwardly toward the outlet ports 40 into a seated position, as viewed in FIG. 3, with the seal face 46 in sealed relation with the port seals 47 and with the flow opening 54 aligned with one of the outlet ports. This downward motion is accompanied by at least some indexing movement as the cam pin 84 on the guide rod 60 moves downwardly through one of the slots 96 between the upper cam teeth 90 and then bears against an angularly oriented upper surface 98 on one of the lower cam teeth 86, as illustrated by arrow 100 in FIG. 7, for movement further downwardly into a slot 88 between a pair of the teeth 86.

According to a primary aspect of the invention, the flow opening 54 in the valve disk 44 is normally closed by a spring-biased control valve 104 until the valve disk reaches the seated position closing the outlet ports. In this manner, water leakage past or through the valve disk 44 is minimized and substantially all of the water supplied to the upstream side of the valve disk acts against the entire surface area of the valve disk to urge the disk downwardly toward the seated position, as viewed in FIG. 3. Since leakage of water past the valve disk is minimized, the downward movement of the valve disk can occur relatively rapidly and in response to a relatively low water pressure by appropriate selection of the compression spring 68 to apply a relatively small upward force to the valve disk. Once seated, the control valve 104 opens at a selected higher pressure chosen in accordance with desired operating conditions by selecting the spring force biasing the control valve toward the normal closed position.

Figure 4:
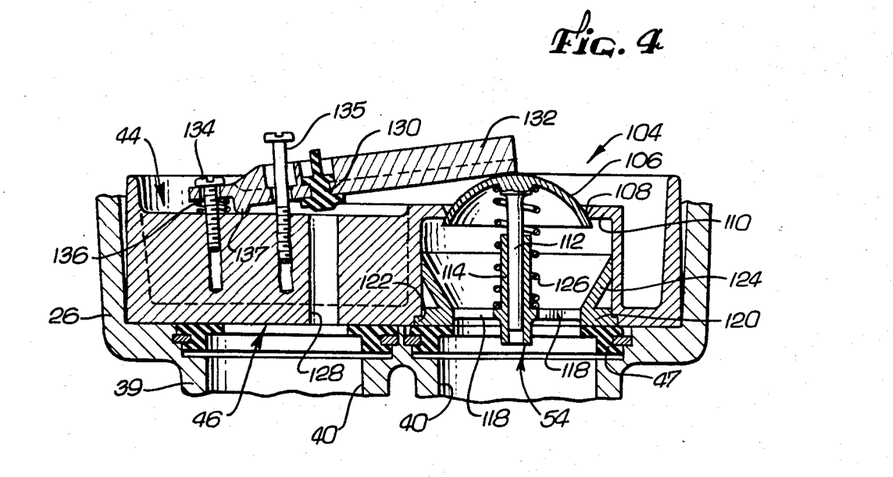
FIG. 4 is an enlarged fragmented vertical section taken generally on the line 4—4 of FIG. 2.

The control valve 104 comprises, in the illustrated preferred form, a generally spherically shaped valve head 106 for movement upwardly to engage an annular valve seat 108 defined by a radially inwardly projecting flange 110 at a position spaced above the seal face 46. This valve head 106 is carried by a downwardly projecting stem 112 supported within a guide cylinder 114 which is in turn formed integrally with a plurality of radially outwardly projecting arms 118 joined to a mounting ring 120. The mounting ring 120, as shown best in FIG. 4, is secured into a counterbore 122 such that its lower face is coplanar with the seal face 46 of the valve disk 44 and thereby rests in sealing engagement with the underlying port seal 47 when the valve disk is in the lower position. If desired, the mounting ring 120 can be joined with an upper truncated conical section 124 for guiding water flow smoothly in a downward direction through the flow opening 54 to the adjacent aligned outlet port 40. A compression spring 126 reacts between the arms 118 and the underside of the valve head 106 to provide a selected force urging the valve head upwardly toward a normal position closing the flow opening 54, wherein the spring force applied by the control valve spring 126 is chosen to maintain the valve head against the seat 108 until the fluid pressure in the chamber 38 reaches a selected magnitude greater than that required to move the valve disk to the seated position over the outlet ports.

The valve head 106 thus blocks water flow through the valve disk when water pressure is relatively low, such as when the water supply is being turned on, to insure rapid movement of the valve disk toward the outlet ports to the seated position covering those outlet ports. When the seated position is reached, the control valve 104 opens at a selected low pressure, which can be relatively precisely chosen by appropriate selection of the spring 126, to permit water flow through the aligned outlet port.

When the water supply is subsequently turned off and the flow of water stops, the pressure differential across the control valve 104 becomes less than that required to hold the control valve open whereupon the spring 126 returns the control valve head 106 to the closed position. When this occurs, the spring 68 urges the valve disk 44 in a direction away from the outlet ports 40 toward the position viewed in FIG. 5, provided the force applied by the spring 68 is sufficient to overcome any residual pressure applied to the disk as a result of water remaining in the valve chamber 38.

Water remaining in the valve chamber 38 at the upstream side of the valve disk 44 when the water supply is turned off is discharged from the chamber to relieve any pressure which could otherwise prevent spring-assisted movement of the valve disk 44 away from the outlet ports. This water discharge is achieved through a relatively small bleed port 128 formed in the valve disk 44 wherein this bleed port is aligned with an outlet port 40 different from the outlet port in alignment with the flow opening 54. Accordingly, water remaining in the valve chamber 38 when the water supply is turned off is relieved through the bleed port 128 to a low pressure location defined by the different outlet port thereby preventing a pressure differential across the valve disk from stopping the spring-assisted movement of the valve disk away from the outlet ports.

The bleed port 128 is advantageously closed when the control valve 104 is in an open position to prevent leakage of water through the bleed port when flow through the outlet port 40 aligned with the flow opening 54 is desired. In this regard, a relatively small valve member 130 formed from a molded resilient material or the like is supported by a cantilevered follower arm 132 having one end connected relatively loosely to the valve disk by a screw 134. The follower arm extends from the screw in a direction to overlie the bleed port 128 and to at least partially overlie the control valve 104, with a second screw 135 being relatively loosely received through the arm 132 to maintain the arm in this desired direction of alignment. A relatively small spring 136 reacts between the screw 134 and valve disk 44 to urge the opposite end of the follower arm 132 to pivot with a relatively small force about a fulcrum 137 thereby bringing the valve member 130 into sealing engagement over the bleed port 128. However, when the control valve 104 is closed, the valve head engages the opposite end of the follower arm 132 and overcomes the force of the spring 126 to lift the follower arm against the spring 136 thereby lifting the valve member 130 from the bleed port 128 and permitting discharge of water through the bleed port to the outlet port therebelow.

The configuration of the port seals 47 helps to prevent backflow through the outlet ports 40 into the valve chamber 38 during certain conditions of sequencing valve operation which could otherwise communicate back pressure to the valve chamber 38 where it could interfere with valve disk sequencing movement. More particularly, water remaining within one or more of the outlet conduits 14 when the water supply is turned off may result in a significant back pressure applied to the seal face 46 of the valve disk, wherein this back pressure may be sufficient to cause localized deflection of the valve disk away from the beads 51 on the port seals. When this occurs, however, the upwardly extending compliant lips 53 of the port seals are urged upwardly by the back pressure into sealing engagement with the seal face 46 to prevent backflow through the outlet ports 40. This sealing engagement is maintained upon initiation of upward valve disk movement at least until other relatively lower or non-back pressured outlet ports 40 are opened. Accordingly, the relatively higher back pressured ports open last whereupon the back pressured water is relieved directly into the other already-open ports, thereby preventing communication of the back pressure to the valve chamber 38 where it could otherwise lock the valve disk against the desired upward sequencing movement.

In operation, when the water supply is turned on, the valve disk 44 moves relatively rapidly to the seated position closing the outlet ports, with an insignificant portion of the water passing through the bleed port 128 until the seated position is reached and the control valve 104 opens. When the water supply is turned off, the control valve 104 closes to engage and lift the follower arm 132 thereby withdrawing the valve member 130 from the bleed port 128. If back pressure is present in the valve chamber 38, this back pressure is relieved through the bleed port to insure spring-assisted movement of the valve disk back toward a position spaced from the outlet ports ready for subsequent return to the lower seated position when the water supply is again turned on. Thus, the valve disk 44 reciprocates and indexes each time the water is turned on and off to align the flow opening 54 sequentially with the plurality of outlet ports 40.

According to a further feature of the invention, the movement of the valve disk 44 is indicated by the selector knob 16 which is both visible and accessible from the exterior of the valve housing. As shown best in FIGS. 1-3, this selector knob 16 has a generally inverted cup-shaped geometry for reception into an annular recess 142 in the top of the housing cap 76 and for connection to the upper end of the guide rod 60 by a screw 144 or the like and suitable key (not shown). The selector knob will therefore reciprocate and index with respect to the central axis 42 of the valve chamber 38 along with the guide rod 60 and the valve disk 44. An arrowhead 146 is provided on the uppermost surface of the selector knob for association with numerical indicia or the like formed on an indicator dial 148 fitted into the cap recess 142, with numbers one through six being illustrated in FIG. 1 to refer respectively to the six outlet ports 40. Thus, by viewing the position of the arrowhead 146 relative to the numerical indicia, the outlet port to which water is being supplied, or the outlet port to which water will be supplied next, is known.

The size and shape of the selector dial 16 is chosen to fit substantially flush into the cap recess 142 when the valve disk is in the lower position seated over the outlet ports, as viewed in FIG. 3. In this position, the selector knob is visible but cannot be grasped manually thereby preventing any attempt to rotate the valve disk while in use. However, when the valve disk 44 is in the upper position displaced from the outlet ports 40, as viewed in FIG. 5, the selector knob 16 protrudes from the housing cap 76 such that it is readily grasped for turning movement to selectively adjust the rotational position of the valve disk with respect to the outlet ports. This rotational adjustment is permitted by providing a circumferential groove 150 at the upper extent of the cam ring 80 above its teeth 90 to allow the follower pin 84 on the guide rod 60 to be rotated through any portion of a full 360 degrees rotation with respect to the cam teeth 90. Thus, the rotational position of the valve disk can be selected to choose which outlet port 40 will be connected next with the supply line 12.

The sequencing valve of this invention thus responds rapidly and positively to a relatively low water pressure and flow rate for coupling one of a plurality of outlet conduits 14 to the water supply line 12 when the water supply is turned on. The ability of the valve to reset and index when the water supply is turned off is substantially independent of the elevation of the sequencing valve relative to other portions of the irrigation system. In addition, the sequencing valve provides an externally visible means for indicating and/or selecting the particular outlet conduit to be connected next to the water supply line.

A variety of modifications and improvements to the sequencing valve described herein are believed to be apparent to one skilled in the art. Accordingly, no limitation on the invention is intended, except by way of the appended claims.

What is claimed is:

1. A sequencing valve for coupling a fluid from a supply line in sequence to a plurality of outlet conduits, comprising:

a valve housing having an inlet port for connection to the supply line and a plurality of outlet ports for respective connection to the outlet conduits;

a valve disk within said housing generally between said inlet port and said outlet ports and having a flow opening formed therein;

means for suppporting said valve disk for movement toward a position seated over said outlet ports with said flow opening aligned with one of said outlet ports when the pressure of fluid supplied through said inlet port reaches a predetermined threshold and for movement away from said seated position when the pressure is less than the predetermined threshold, said support means including means for aligning said flow opening in sequence with said outlet ports upon successive pressure increases to the predetermined threshold; and a control valve for closing said flow opening unless said valve disk is in said seated position;

said valve disk further having a relatively small bleed port formed therein in a position for alignment with one of said outlet ports other than the outlet port in alignment with said flow opening.

2. The sequencing valve of claim 1 wherein said control valve includes means responsive to the pressure of fluid supplied through said inlet port for preventing passage of the fluid through the flow opening unless said pressure reaches a predetermined magnitude greater than the predetermined threshold.

3. The sequencing valve of claim 2 wherein said control valve comprises a valve head movable between a closed position closing said flow opening and an open position opening said flow opening, and a spring for urging said valve head with a preselected force toward said closed position.

4. The sequencing valve of claim 3 further including a valve member movable between a position closing said bleed port and a position opening said bleed port, means for biasing said valve member toward said position closing said bleed port, and means responsive to the position of said valve head for overriding said biasing means and for moving said valve member to the position opening said bleed port when said valve head is in said closed position.

5. The sequencing valve of claim 3 further including a valve member for opening and closing said bleed port, a follower arm movably mounted on said valve disk and carrying said valve member, and means for biasing said follower arm toward a position with said valve member closing said bleed port, said follower arm being engageable by said valve head for moving said follower arm to a position with said valve member opening said bleed port when said valve head is in said closed position.

6. The sequencing valve of claim 1 further including a valve member for opening and closing said bleed port, means for biasing said valve member toward a position closing said bleed port, and means responsive to the position of said control valve for moving said valve member toward a position opening said bleed port when said control valve is in a position closing said flow opening.

7. The sequencing valve of claim 1 wherein said valve disk is positioned within a chamber formed in said valve housing, and wherein said support means includes means for permitting reciprocating movement of said valve disk toward and away from said seated position, means for urging said valve disk away from said seated position, and means responsive to reciprocation of said valve disk for indexing said valve disk to align said flow opening in sequence with said outlet ports upon successive pressure increases to the predetermined threshold.

8. The sequencing valve of claim 7 wherein said indexing means comprises a cam assembly including a cam pin and a plurality of cam surfaces for engagement by said cam pin to index said valve disk in response to reciprocation of said valve disk.

9. The sequencing valve of claim 8 further including indicator means visible from the exterior of said valve housing and coupled to said valve disk for movement therewith to provide an externally visible indication of the position of said valve disk relative to said outlet ports.

10. The sequencing valve of claim 9 wherein said indicator means comprises a selector knob accessible from the exterior of said valve housing and coupled to said valve disk for indexing movement therewith, and wherein said cam surfaces define a substantially uninterrupted groove within which said cam pin is received when said valve disk is in said position away from said seated position to permit adjustment of the indexing position of said selector knob and said valve disk from the exterior of said valve housing.

11. The sequencing valve of claim 10 wherein said selector knob is further coupled to said valve disk for reciprocating movement therewith, said valve housing includes an externally open recess for substantial reception of said selector knob when said valve disk is in said seated position, said selector knob being movable to a position protruding from said recess upon movement of said valve disk away from said seated position.

12. The sequencing valve of claim 9 including externally visible indicia associated with said indicator means for indicating the position of said valve disk relative to said outlet ports.

13. The sequencing valve of claim 1 including indicator means visible from the exterior of said valve housing and coupled to said valve disk for movement therewith to provide an externally visible indication of the position of said valve disk relative to said outlet ports.

14. The sequencing valve of claim 13 wherein said indicator means comprises a selector knob accessible from the exterior of said valve housing, said support means includes means for permitting adjustment of the position of said selector knob when said valve disk is in said position away from said seated position to permit adjustment from the exterior of said valve housing of the position of said valve disk flow opening relative to said outlet ports.

15. A sequencing valve for coupling a fluid from a supply line in sequence to a plurality of outlet conduits, comprising:
a valve housing having an inlet port for connection to the supply line and a plurality of outlet ports for respective connection to the outlet conduits;
a valve disk within said housing generally between said inlet port and said outlet ports and having a flow opening formed therein; and
means for supporting said valve disk for movement toward a position seated over said outlet ports with said flow opening aligned with one of said outlet ports when the pressure of fluid supplied through said inlet port reaches a predetermined threshold and for movement away from said seated position when the pressure is less than the predetermined threshold, said support means including means for aligning said flow opening in sequence with said outlet ports upon successive pressure increases to the predetermined threshold;
said valve disk further having a relatively small bleed port formed therein in a position for alignment with one of said outlet ports other than the outlet port in alignment with said flow opening.

16. The sequencing valve of claim 15 including a control valve for closing said flow opening unless said valve disk is in said seated position, said control valve including a valve head movable between a closed position closing said flow opening and an open position opening said flow opening, and a spring for urging said valve head with a preselected force toward said closed position to prevent movement of said valve head to said open position unless said pressure reaches a predetermined magnitude greater than the predetermined threshold.

17. The sequencing valve of claim 16 further including a valve member for opening and closing said bleed port, a follower arm movably mounted on said valve disk and carrying said valve member, and means for biasing said follower arm toward a position with said valve member closing said bleed port, said follower arm being engageable by said valve head for moving said follower arm to a position with said valve member opening said bleed port when said valve head is in said closed position.

18. The sequencing valve of claim 16 including indicator means visible from the exterior of said valve housing and coupled to said valve disk for movement therewith to provide an externally visible indication of the position of said valve disk relative to said outlet ports.

19. The sequencing valve of claim 18 wherein said indicator means comprises a selector knob accessible from the exterior of said valve housing, said support means including means for permitting adjustment of the position of said selector knob when said valve disk is in said position away from said seated position to permit adjustment from the exterior of said valve housing of the position of said valve disk flow opening relative to said outlet ports.

20. A sequencing valve for coupling a fluid from a supply line in sequence with a plurality of outlet conduits, comprising:
   a valve housing having an inlet port for connection to the supply line and a plurality of outlet ports for respective connection to the outlet conduits;
   a valve disk within said housing generally between said inlet port and said outlet ports and having a flow opening formed therein;
   means for supporting said valve disk for movement toward a position seated over said outlet ports with said flow opening aligned with one of said outlet ports when the pressure of fluid supplied through said inlet port reaches a predetermined threshold and for movement away from said seated position when the pressure is less than the predetermined threshold, said support means including means for aligning said flow opening in sequence with said outlet ports upon successive pressure increases to the predetermined threshold; and
   a control valve for closing said flow opening unless said valve disk is in said seated position, said control valve including a valve head movable between a closed position closing said flow opening and an open position opening said flow opening, and a spring for urging said valve head with a preselected force toward said closed position and for preventing valve head movement toward said open position unless the pressure of fluid supplied through said inlet port reaches a predetermined magnitude greater than the predetermined threshold.

21. The sequencing valve of claim 20 wherein said valve disk further includes a relatively small bleed port formed therein in a position for alignment with one of said outlet ports other than the outlet port in alignment with said flow opening.

22. The sequencing valve of claim 21 further including a valve member for opening and closing said bleed port, a follower arm movably mounted on said valve disk and carrying said valve member, and means for biasing said follower arm toward a position with said valve member closing said bleed port, said follower arm being engageable by said valve head for moving said follower arm to a position with said valve member opening said bleed port when said valve head is in said closed position.

23. The sequencing valve of claim 21 further including a valve member for opening and closing said bleed port, means for biasing said valve member toward a position closing said bleed port, and means responsive to the position of said control valve for moving said valve member toward a position opening said bleed port when said control valve is in a position closing said flow opening.

24. The sequencing valve of claim 20 including indicator means visible from the exterior of said valve housing and coupled to said valve disk for movement therewith to provide an externally visible indication of the position of said valve disk relative to said outlet ports.

25. The sequencing valve of claim 24 wherein said indicator means comprises a selector knob accessible from the exterior of said valve housing, said support means including means for permitting adjustment of the position of said selector knob when said valve disk is in said position away from said seated position to permit adjustment from the exterior of said valve housing of the position of said valve disk flow opening relative to said outlet ports.

26. A sequencing valve for coupling a fluid from a supply line in sequence to a plurality of outlet conduits, comprising:
   a valve housing having an inlet port for connection to the supply line and a plurality of outlet ports for respective connection to the outlet conduits;
   a valve disk within said housing generally between said inlet port and said outlet ports and having a flow opening formed therein;
   means for supporting said valve disk for movement toward a pressure-responsive advanced position seated over said outlet ports with said flow opening aligned with one of said outlet ports when the pressure of fluid supplied through said inlet port reaches a predetermined threshold and for movement away from said seated position to a normal fully retracted position when the pressure is less than the predetermined threshold, said support means including means for aligning said flow opening in sequence with said outlet ports upon successive pressure increases to the predetermined threshold;
   indicator means including a selector knob accessible from the exterior of said housing and coupled to said valve disk for movement therewith to provide an externally visible indication of the position of said valve disk relative to said outlet ports; and
   a control valve for closing said flow opening unless said valve disk is in said advanced position;
   said support means including means for permitting rotational adjustment of the position of said selector knob when said valve disk is in said fully retracted position away from said advanced position to permit adjustment from the exterior of said valve housing of the position of said valve disk flow opening relative to said outlet ports.

27. The sequencing valve of claim 26 wherein said valve disk is positioned within a chamber formed in said valve housing, and wherein said support means includes means for permitting reciprocating movement of said valve disk toward and away from said advanced position, means for urging said valve disk away from said advanced position, and means responsive to reciprocation of said valve disk for indexing said valve disk to align said flow opening in sequence with said outlet ports upon successive pressure increases to the predetermined threshold.

28. The sequencing valve of claim 27 wherein said indexing means comprises a cam assembly including a cam pin and a plurality of cam surfaces for engagement by said cam pin to index said valve disk in response to reciprocation of said valve disk.

29. The sequencing valve of claim 28 wherein said cam surfaces define a substantially uninterrupted groove within which said cam pin is received when said valve disk is in said retracted position away from said seated position to permit adjustment of the indexing position of said selector knob and said valve disk from the exterior of said valve housing.

30. The sequencing valve of claim 29 wherein said selector knob is further coupled to said valve disk for reciprocating movement therewith, said valve housing including an externally open recess for substantial reception of said selector knob when said valve disk is in said advanced position, said selector knob being movable to a position protruding from said recess upon movement of said valve disk away from said advanced position.

31. The sequencing valve of claim 26 including externally visible indicia associated with said indicator means for indicating the position of said valve disk relative to said outlet ports.

32. The sequencing valve of claim 26 wherein said valve disk further includes a relatively small bleed port formed therein in a position for alignment with one of said outlet ports other than the outlet port in alignment with said flow opening.

33. A sequencing valve for coupling a fluid from a supply line in sequence to a plurality of outlet conduits, comprising:
a valve housing having an inlet port for connection to the supply line and a plurality of outlet ports for respective connection to the outlet conduits;
a valve disk within said housing generally between said inlet port and said outlet ports and having a flow opening formed therein;
means for supporting said valve disk for movement toward a position seated over said outlet ports with said flow opening aligned with one of said outlet ports when the pressure of fluid supplied through said inlet port reaches a predetermined threshold and for movement away from said seated position when the pressure is less than the predetermined threshold, said support means including means for aligning said flow opening in sequence with said outlet ports upon successive pressure increases to the predetermined threshold;
a control valve for closing said flow opening unless said valve disk is in said seated position;
said valve disk further having a relatively small bleed port formed therein in a position for alignment with one of said outlet ports other than the outlet port in alignment with said flow opening; and
a selector knob accessible from the exterior of said valve housing and coupled to said valve disk for movement therewith to provide an externally visible indication of the position of said valve disk relative to said outlet ports, said support means including means for permitting adjustment of the position of said selector knob when said valve disk is in said position away from said seated position to permit adjustment from the exterior of said valve housing of the position of said valve disk flow opening relative to said outlet ports.

34. A sequencing valve for coupling a fluid from a supply line in sequence to a plurality of outlet conduits, comprising:
a valve housing having an inlet port for connection to the supply line and a plurality of outlet ports for respective connection to the outlet conduits;
a valve disk within said housing generally between said inlet port and said outlet ports and having a flow opening formed therein;
a control valve for opening and closing said flow opening;
means for supporting said valve disk for movement toward a position seated over said outlet ports with said flow opening aligned with one of said outlet ports when the pressure of fluid supplied through said inlet port reaches a predetermined threshold and for movement away from said seated position when the pressure is less than the predetermined threshold, said support means including means for aligning said flow openings in sequence with said outlet ports upon successive pressure increases to the predetermined threshold;
said valve disk further having a relatively small bleed port formed therein in a position for alignment with one of said outlet ports other than the outlet port in alignment with said flow opening;
a valve member for opening and closing said bleed port;
means for biasing said valve member toward a position closing said bleed port; and
means responsive to the position of said control valve for moving said valve member toward a position opening said bleed port when said control valve is in a position closing said flow opening.

35. A sequencing valve for coupling a fluid from a supply line in sequence to a plurality of outlet conduits, comprising:
a valve housing having an inlet port for connection to the supply line and a plurality of outlet ports for respective connection to the outlet conduits;
a valve disk within said housing generally between said inlet port and said outlet ports and having a flow opening formed therein;
means for supporting said valve disk for movement toward a position seated over said outlet ports with said flow opening aligned with one of said outlet ports when the pressure of fluid supplied through said inlet port reaches a predetermined threshold and for movement away from said seated position when the pressure is less than the predetermined threshold, said support means including means for aligning said flow opening in sequence with said outlet ports upon successive pressure increases to the predetermined threshold;
a control valve for closing said flow opening unless said valve disk is in said seated position;
said valve disk further having a relatively small bleed port formed therein in a position for alignment with one of said outlet ports other than the outlet port in alignment with said flow opening;
a valve member for opening and closing said bleed port;
means for biasing said valve member toward a position closing said bleed port;
means responsive to the position of said control valve for moving said valve member toward a position opening said bleed port when said control valve is in a position closing said flow opening; and a selector knob accessible from the exterior of said valve housing and coupled to said valve disk for movement therewith with respect to indicia formed on said valve housing to provide an externally visible indication of the position of said valve disk relative to said outlet ports, said support means including means for permitting adjustment of the position of said selector knob when said valve disk is in said position away from said seated position to permit adjustment from the exterior of said valve housing of the position of said valve disk flow opening relative to said outlet ports.

* * * * *